United States Patent [19]

Shinozaki et al.

[11] 4,306,139
[45] Dec. 15, 1981

[54] METHOD FOR WELDING HARD METAL

[75] Inventors: Yukio Shinozaki, Funabashi; Katsutoshi Naruse; Teruo Harada, both of Yokohama; Sadao Ohishibashi, Funabashi; Susumu Yamaya, Komae; Akira Fukawa, Hiratsuka, all of Japan

[73] Assignee: Ishikawajima-Harima Jukogyo Kabushiki Kaisha, Tokyo, Japan

[21] Appl. No.: 106,719

[22] Filed: Dec. 26, 1979

[30] Foreign Application Priority Data

Dec. 28, 1978 [JP] Japan .................................. 53/163496

[51] Int. Cl.³ .......................... B23K 9/04; B23K 9/225
[52] U.S. Cl. .............................. 219/137 WM; 219/77; 219/118; 219/146.41
[58] Field of Search ............ 219/137 WM, 77, 146.41, 219/118

[56] References Cited

U.S. PATENT DOCUMENTS 1,901,654  3/1933  Kerr ...................................... 219/77

FOREIGN PATENT DOCUMENTS 1076524  7/1967  United Kingdom ........... 219/146.41

OTHER PUBLICATIONS

Hobart Brochure Electrodes/Wire/Flux EW500 NWSA 600, 1979, Hobart Co., TRO40H10, p. 17.

Primary Examiner—E. A. Goldberg
Attorney, Agent, or Firm—Alfred E. Miller

[57] ABSTRACT

Disclosed is a method for welding wear-resisting hard metals directly to iron base members which are slide or wear members of machinery. Hard metals comprising a tungsten carbide and a binder consisting of 15 to 30% by weight of Ni and/or Co is employed as said hard metals. A Ni alloy metal containing no Cr is used as a filler metal.

2 Claims, 6 Drawing Figures

X 200

X 200

X 200

METHOD FOR WELDING HARD METAL

BACKGROUND OF THE INVENTION

The present invention relates to a method for welding hard metals directly to wear members in order to enhance their resistance to wear, the wear members being in general made of iron base metals an being for instance the inner surfaces of the outer shells of centrifugal separators, the screw blades in the inner shells of centrifugal separators, the wear members of construction machines such as wear parts of concrete pump shutoff valves, side guides of rolling mill stands and so on.

It has been long considered that it is impracticable to weld hard metals to iron base metals such as cast iron, ordinary steels and stainless steels, mainly because of the resultant thermal cracking of the hard metals, the resultant formation of structurally defective layers in the weld and the extreme decrease in strength due to the structurally defective layers. Therefore, the methods for mechanically joining hard metals to the wear members with pins, for silver brazing hard metals to the wear members or for indirectly welding hard metals to the wear members through the backing plates have been mainly employed.

For instance, in order to join hard metal segments to the screw blades in the inner shells of centrifugal separators, there have been proposed (1) the method disclosed in U.S. patent application Ser. No. 533,198 filed Dec. 16, 1974 and now U.S. Pat. No. 3,977,515 wherein a segment is inserted into a dovetail groove of a screw blade and is joined at one end to the blade with a pin and (2) the method disclosed in U.S. Pat. No. 3,764,062 wherein a hard metal segment is securely joined, by silver brazing, to a backing plate and then the backing plate is welded to the screw blade. The former is unsatisfactory in practice with respect to workability and setting strength. The latter has been widely appreciated to be useful because of easiness in operation. However, a further improvement has been desired wherein a hard metal is directly welded to wear members without the resultant thermal cracking, by selected combination of hard metal and filler metal.

An object of the present invention is therefore to provide a method for directly welding hard metals to iron base metals, the method having been so far considered impossible.

Another object of the present invention is to provide a method for easily and positively welding hard metals to wear members of for example centrifugal separators, construction machines and rolling mill stands in order to ensure long service life of machinery.

A further object of the present invention is to provide a method for welding hard metals to wear members which facilitates the replacement operation of hard metal members when such members are worn out or suddenly broken.

The present invention will become more apparent from the following description of a preferred embodiment thereof taken in conjunction with the accompanying drawings.

Figure 1:
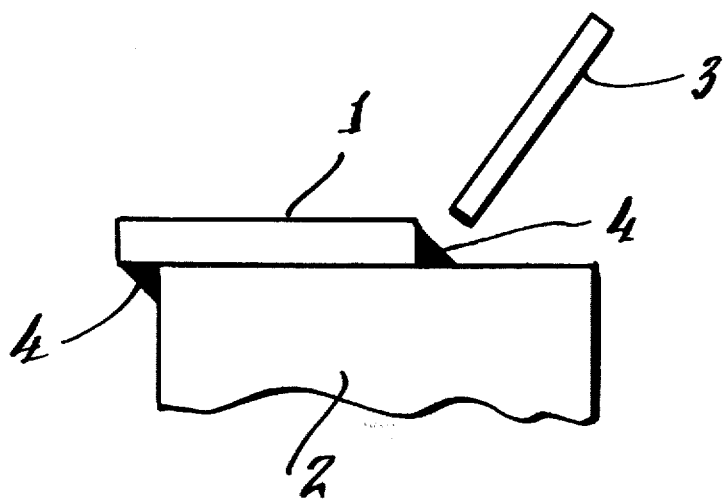
FIG. 1 is a view used for the explanation of the method in accordance with the present invention for welding a hard metal member directly to an iron base metal member.

Referring first to FIG. 1, a hard metal tile 1 is made of a tungsten carbide (WC) and a metal binder consisting of Ni and/or Co and is fillet welded at 4 to an iron base member 2 such as cast iron, ordinary steel and stainless steel with a filler rod 3.

The present invention is directed to direct welding of the hard metal tile 1 to the iron base member 2. To this end, it is necessary to prevent the formation of structurally defective layers in the weld 4 and to prevent the generation of thermal cracking of the hard metal tile 1. For these requirements, the present invention uses a hard metal comprising a tungsten carbide (WC) and a binder consisting of 15–30% by weight of Ni and/or Co as the tile 1 and the filler rod 3 made of a nickel alloy containing no Cr.

When the content of such binder exceeds 30% by weight, deformations result when sintered. When the binder contents is less than 15% by weight, cracking due to heat is produced readily when welded.

In view of the above, according to the present invention, the binder contents in the tungsten carbide (WC) series hard metals employed are defined specifically as will be described below so that the resistance to thermal shock may be increased. In addition, the nickel alloy filler containing no Cr is employed. As a consequence, the binder in the hard metal and Ni in the filler rod are fused to each other so that the hard metal tile 1 may be welded to the iron base metal satisfactorily by forming a rigid weld 4.

The nickel alloy filler rod 3 which contains no Cr has a Ni content of preferably higher than 40% by weight. When the filler rod having a Ni content of lower than 40% with the remainder being Fe is used, carbon appears as martensite in the weld to increase the brittleness thereof, resulting in decrease in strength of the weld. The particle size of the tungsten carbides in the hard metals is preferably 4 to 8 μm after sintered from the viewpoint of thermal shock resistance and wear resistance.

The welding method in accordance with the present invention may eliminate the formation of structurally defective layers in the weld 4 and the thermal cracking of the hard metal tile 1 and may ensure sound welds. In addition, the direct welding of hard metals to iron base metal, which hitherto had been considered impossible, may be accomplished even by unskilled operators. Furthermore, because of the direct welding of hard metals to iron base metal, the welds are extremely high in strength and very stable.

Next some tests of the present invention will be described below.

Figure 2A:
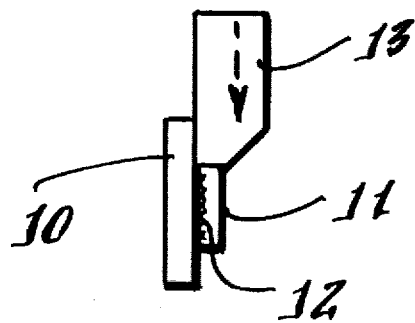
FIG. 2(A) shows a method employed for testing the weld strength.
Figure 2B:
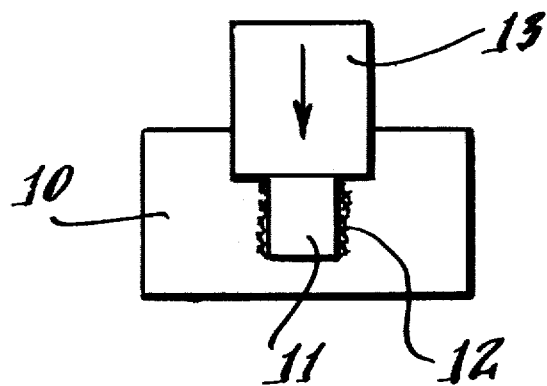
FIG. 2(B) is a front view of FIG. 2(A)

Specimens:

| | -continued |
|---|---|
| Hard metal: | WC - 25% by weight of Ni Particle size of WC is 4 to 8μm after sintered. |
| Base metal: | 18-8 stainless steel |
| Welding procedure: | Shielded arc welding with current of 80 to 130 amperes (A) |
| Testing procedures: | As shown in FIGS. 2(A) and (B), a hard metal specimen 11 is fillet welded to a base metal 10 at 12 and a jig 13 is pressed against the hard metal tile 11 and pushed downward to determine a breaking point. |

The results of tests are shown in Table below.

| Filler metal specimen No. | Constituents, % by weight | | | | Breaking stress Kg/mm$^2$ | Structure of weld |
|---|---|---|---|---|---|---|
| | Ni | Cr | Mo | Fe | | |
| 1 | 10 | 20 | | remainder | 18, 19 | x |
| 2 | 13 | 23 | | remainder | 14, 20 | x |
| 3 | 13 | 18 | 2 | remainder | 13, 16 | x |
| 4 | 50 | 13 | 2 | remainder | 18, 18 20, 26, 30 | x |
| 5* | 97 | | | | 40, 49 | o |
| 6 | 55 | | | remainder | 48, 55 | o |

*The remainder of the specimen No. 5 contains 3% by weight of metal elements such as C, Mn and so on.
x = formation of defective layers
o = no formation of defective layers

* The remainder of the specimen No. 5 contains 3% by weight of metal elements such as C, Mn and so on.
x=formation of defective layers
o=no formation of defective layers From the above TABLE, it is seen that when the Ni alloy filler metal contain no Cr, no defective layers are formed in the welds.

Figure 3:
FIG. 3 is a micrograph showing the structure of the weld when a filler metal containing 13% by weight of Ni and 23% by weight of Cr with the remainder being substantially Fe is used.
Figure 4:
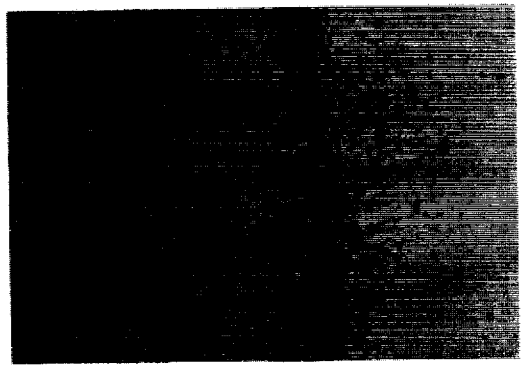
FIG. 4 is a micrograph showing the structure of the weld when a filler metal containing 50% by weight of Ni, 13% by weight of Cr and 2% by weight of Mo with the remainder being substantially Fe is used.
Figure 5:
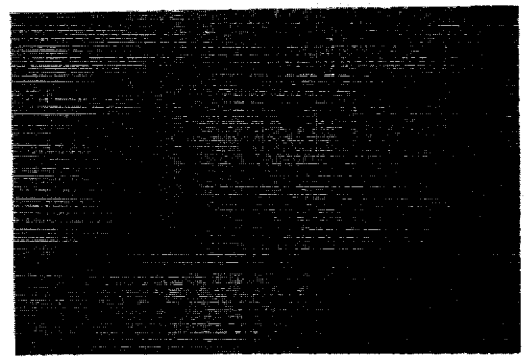
FIG. 5 is a micrograph showing the structure of the weld when a filler metal containing 55% by weight of Ni with the remainder being substantially Fe is used.

FIG. 3 shows the structure of the weld produced with No. 2 filler metal specimen; FIG. 4, that of the weld produced with No. 4 filler metal specimen, the dark black portions indicating the defective layers; and FIG. 5 shows the structure of the weld produced with No. 6 filler metal specimen in accordance with the present invention.

Hard metals or more particularly tungsten carbide series sintered hard metals have a coefficient of thermal expansion which is substantially half as large as that of iron base metal so that cracks are developed in hard metals due to the thermal stresses during welding when filler rods other than a nickel alloy filler rod containing no Cr are employed. However, when a filler metal whose principal constituent is Ni and which contains no Cr is used, no carbides such as carbides of chromium are formed and the thermal stresses are suppressed so that the thermal cracking is avoided. That is, Cr has a strong tendency to combine readily with C so that it readily reacts with C in tungsten carbide (WC) to form carbides of chromium. As a result, the hard metals are decarburized to (W·Ni)$_6$C or (W·Co)$_6$C which very frequently appears at the boundary between the hard metal tile and the weld. These carbides are a few times greater in particle size than WC and are very brittle, thus causing the separation of weld and cracking. However, according to the present invention, the filler metals containing no chromium are used as described above, so that no structually defective layers which are fatal to the welds may be formed.

So far the present invention has been described in conjunction with the shielded arc welding, but it is to be understood that the present invention may be equally applied to TIG (Tungsten Inert Gas) welding.

Ni and/or Co contents of the tungsten carbide (WC) series hard metals are suitably selected within the range of 15 to 30% by weight. Preferable particle size of WC is 4 to 8 μm.

The effects, features and advantages of the welding method of the present invention may be summarized as follows:

(1) The welding method of the present invention may attain the direct welding of hard metals to iron base metal without forming any structurally defective layers in the welds and therefore is applicable to any shapes and constructions of metal pieces to be welded together. As a result, the welding method of the present invention may be easily applied to various fields of machinery fabrication so as to improve the resistance to wear and abrasion.

(2) The welding procedures of the present invention themselves are not complex, so that the welding method of the present invention is directly to any welding process employing filler rods such as shielded arc welding and TIG welding. Therefore unlike the welding including silver brazing operation, welding operations of the present invention may be satisfactorily carried out even by unskilled laborers without the use of special equipment.

(3) Hard metals may be directly welded to iron base metals without being machined or formed into special shapes. As a result, as compared with the prior art methods such as the method for mechanically joining the hard metal, wear resistant members to wear members, both the number of steps and the labor may be reduced.

(4) The weld strength of hard metals to iron base metals is high. Compared with the prior art mechanical method and silver brazing method, the welding method of the present invention may ensure complete and rigid joining so that sufficient strength and stability of the welds are obtained.

(5) Except filler metals (welding rods), no special materials are needed so that replacement and repairing may be easily effected at the workshop.

What is claimed is:

1. A method of welding a hard metal member to an iron base metal member wherein said hard metal member is made of a hard metal comprising mainly tungsten carbides and 15 to 30% by weight of a binder consisting of Ni and/or Co, said hard metal member being directly welded to said iron base metal member with a nickel alloy filler metal containing no Cr, and having more than 40% by weight of Ni.

2. A welding method as set forth in claim 1 wherein said tungsten carbides of the hard metal have a particle size ranging from 4 to 8 μm after being sintered.

* * * * *